United States Patent [19]

Walsh

[11] 4,290,139

[45] Sep. 15, 1981

[54] SYNCHRONIZATION OF A DATA COMMUNICATION RECEIVER WITH A RECEIVED SIGNAL

[75] Inventor: Dale M. Walsh, West Redding, Conn.

[73] Assignee: General DataComm Industries, Inc., Danbury, Conn.

[21] Appl. No.: 972,445

[22] Filed: Dec. 22, 1978

[51] Int. Cl.³ .............................................. H04B 3/04
[52] U.S. Cl. .................................... 375/14; 375/114; 375/116; 333/18; 364/724
[58] Field of Search ............... 325/42, 323; 178/69.1; 375/11, 12, 13, 14, 106, 114, 116; 333/18; 364/724, 728

[56] References Cited

U.S. PATENT DOCUMENTS

| | | | |
|---|---|---|---|
| 3,715,665 | 2/1973 | Chang | 325/65 |
| 3,914,691 | 10/1975 | Meadors, Jr. | 325/42 |
| 3,962,637 | 6/1976 | Motley | 325/42 |
| 3,978,407 | 8/1976 | Forney, Jr. et al. | 375/13 |
| 3,978,435 | 8/1976 | Luvmson et al. | 325/42 |
| 4,021,738 | 5/1977 | Gitlin et al. | 375/14 |
| 4,146,840 | 3/1979 | McRae et al. | 325/42 |

OTHER PUBLICATIONS

"Adaptive Digital Filters for Equalization of Telephone Channels", IEEE Trans. Audio & Electroacoustics vol. AU-18 No. 2 p. 195 Jun. 1970.
"Transmission Systems for Communications", Bell Telephone Labs. pp. 373-395, 722-723 Rev. 4th Ed, 1971.
"Principles of Data Communications", R. W. Lucky, pp. 22-25, 104-105 Mcraw-Hill-1968.
Spread Spectrum Systems, Dixon (Wiley & Sons 1976) p. 192.

Primary Examiner—Benedict V. Safourek
Attorney, Agent, or Firm—Pennie & Edmonds

[57] ABSTRACT

Portions of an adaptive equalizer can be used for exact preamble synchronization by modifying the digital filter section to recognize pre-determined sequences of signals in the received signal. This may be accomplished by applying to the modifying means of the digital filter input signals which are proportional to the complex conjugate of the signals in the received signal. When the signals in the tapped delay line are aligned with this complex conjugate, the output of the summing means will be discernibly greater than otherwise. As a result, a threshold device can be used to recognize the exact baud time the preselected signals in the received signal are contained in the tapped delay line.

10 Claims, 3 Drawing Figures

SYNCHRONIZATION OF A DATA COMMUNICATION RECEIVER WITH A RECEIVED SIGNAL

BACKGROUND AND SUMMARY OF THE INVENTION

This concerns a method and apparatus for using an adaptive equalizer and, in particular, the digital filter section of the equalizer for synchronizing a data communication receiver with a received signal.

Equalizers are commonly used in modem receivers to compensate for amplitude and phase distortions in communication lines. Equalizers may be fixed or adjustable and the adjustable equalizers may be manual or automatic. Automatic equalizers are often referred to as automatic regulators. Adjustable equalizers or regulators may be open or closed loop devices, the closed loop or feedback regulator being designed to respond to a signal on the communication line. See, for example, J. G. Proakis, "Adaptive Digital Filters for Equalization of Telephone Channels", *IEEE Transactions on Audio and Electroacoustics*, Vol. AU-18, No. 2, p. 195 (June 1970); Bell Telephone Laboratories, *Transmission Systems for Communications*, pp. 373-395, 722-723 (Rev. 4th Ed. 1971). An adaptive equalizer typically comprises a tapped delay line through which the received signal is shifted, a plurality of taps in the delay line, means for modifying the amplitude and/or phase of the signal at each tap, and means for summing the modified signal produced by each modifying means. Typically, the modifying means are multipliers which multiply the signals at the taps with coefficients selected to correct for amplitude and phase distortions in the received signal that is shifted through the tapped delay line.

Some type of synchronization between the receiver and the signal it receives is absolutely necessary for the receiver to properly interpret the received signal. At a minimum, the receiver modem must establish baud synchronization which requires the baud rate at the receiver to be exactly the same as that in the data being received and properly phased with such data. In addition, some receiver implementations, e.g., coherent detectors, require carrier synchronization and preamble synchronization. Ideally, for carrier synchronization the local carrier signal is at the same frequency and properly phased to the transmitter carrier signal that modulates the signal being received although it is recognized that the effect of carrier synchronization can be achieved without actually synchronizing signals.

For preamble synchronization a locally generated training sequence must be in phase with a preamble training sequence which is located at the beginning of the received data signal. Preamble synchronization is either exact, i.e., established within one baud time or approximate, i.e., within an acceptable tolerance for the receiver to properly synchronize. Exact synchronization permits superior training capability. To achieve exact preamble synchronization in the prior art, it is customary to insert a leading edge timing signal at the beginning of the transmitted signal and to employ suitable apparatus in the receiver to detect such a timing signal. As will be apparent, the production and detection of such a signal requires special apparatus and the added costs and complexity inherent therein. As a result, not all receiver modems are designed to achieve exact carrier synchronization or preamble synchronization. For example, the Bell System 208 modem does not provide a timing event but relies on the receiver to correctly detect a four-phase sequence in the training sequence in order to establish equalizer training. Such approximate permeable synchronization, however, depends on the ability of the communication channel to transmit the four-phase training sequence error free. Beyond a certain degree of channel amplitude and phase distortion, errors are introduced and adaptive equalization can not be established.

I have found that portions of an adaptive equalizer can be used for exact preamble synchronization by modifying the digital filter section to recognize a predetermined signal in the received signal. This may be accomplished by applying to the modifying means of the digital filter input signals which are proportional to the complex conjugate of signals in the received signal. When the signals in the tapped delay line are aligned with this complex conjugate, the output of the summing means will be discernibly greater than otherwise. As a result, a threshold device can be used to recognize the exact baud time the preselected signals in the received signal are contained in the tapped delay line. The output of such threshold means can then be used in conventional fashion to establish exact preamble synchronization between the receiver and the received signal.

BRIEF DESCRIPTION OF THE DRAWING

These and other objects, features and elements of my invention may readily be apparent from the following detailed description of the invention in which.

DETAILED DESCRIPTION OF THE INVENTION

Figure 1:
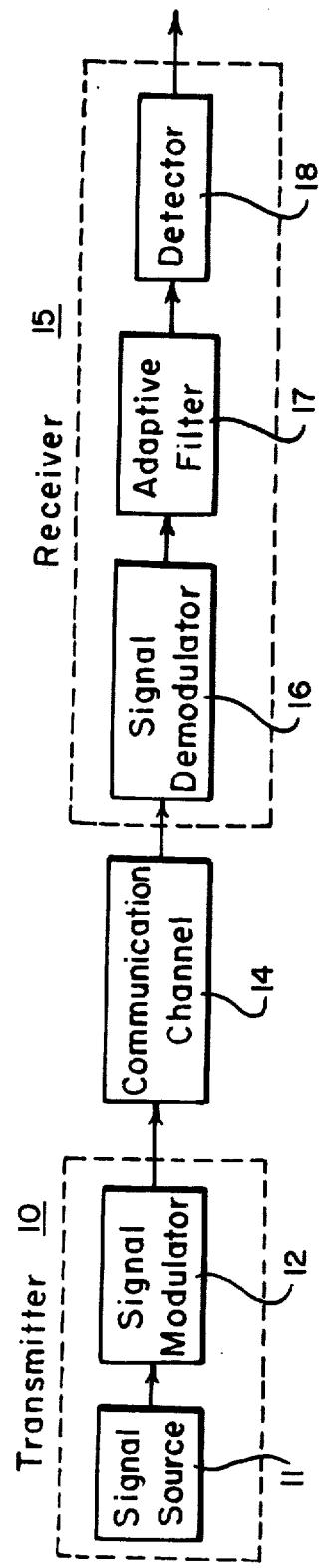
FIG. 1 is a schematic illustration of a typical prior art communication channel.

A typical wide-band communication system comprises a transmitter 10, a communication channel 14 and a receiver 15. The transmitter 10 includes a signal source 11 and a signal modulator 12 which is one-half of a modulator/demodulator (modem). Receiver 15 includes a signal demodulator 16, an adaptive equalizer 17, and a detector 18. Demodulator 16 is the second half of the receiver modem. The adaptive equalizer is used to compensate for amplitude and phase distortions in the communication channel. Typically, it is automatically adjustable by means of a closed loop feedback system. Such equalizers are commonly used in any communication channel having a data transmission rate of 4800 bits/second or more.

Figure 2:
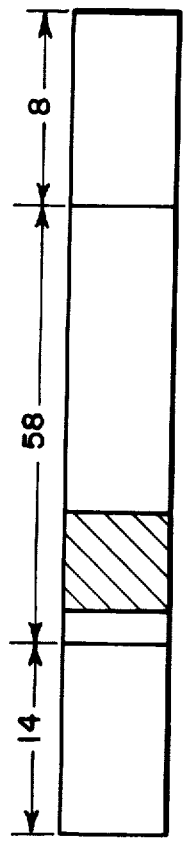
FIG. 2 is a schematic representation of a training sequence used in the practice of my invention.

The typical signal receiving process involves detection of the signal at the receiver, adjustment of the gain of the receiver, establishment of baud synchronization and establishment of preamble synchronization. These events take place during reception of a training sequence. A typical training sequence used in a 4800 bits/second (bps) modem is the CCITT V.27 training sequence set forth in FIG. 2. For 4800 bps signal transmission using three data bits per symbol, such a training sequence is usually about 80 symbols long. The first 14 of these symbols are taken up with phase reversals to facilitate rapid carrier and baud timing synchronization. During this period of time the signal is detected and gain is adjusted. The next 58 symbols are made up of a two symbol pseudo-random sequence and the final eight symbols are made up of an eight symbol pseudo-random sequence. Preamble synchronization is established early in the reception of the two symbol pseudo-random sequence. The shaded area within the two symbol pseudo-random sequence indicates a portion of that sequence which is used in accordance with my invention to establish preamble synchronization. Typically, this shaded area is on the order of 12 symbols in length but my invention might be practiced with shorter or longer sequences.

Figure 3:
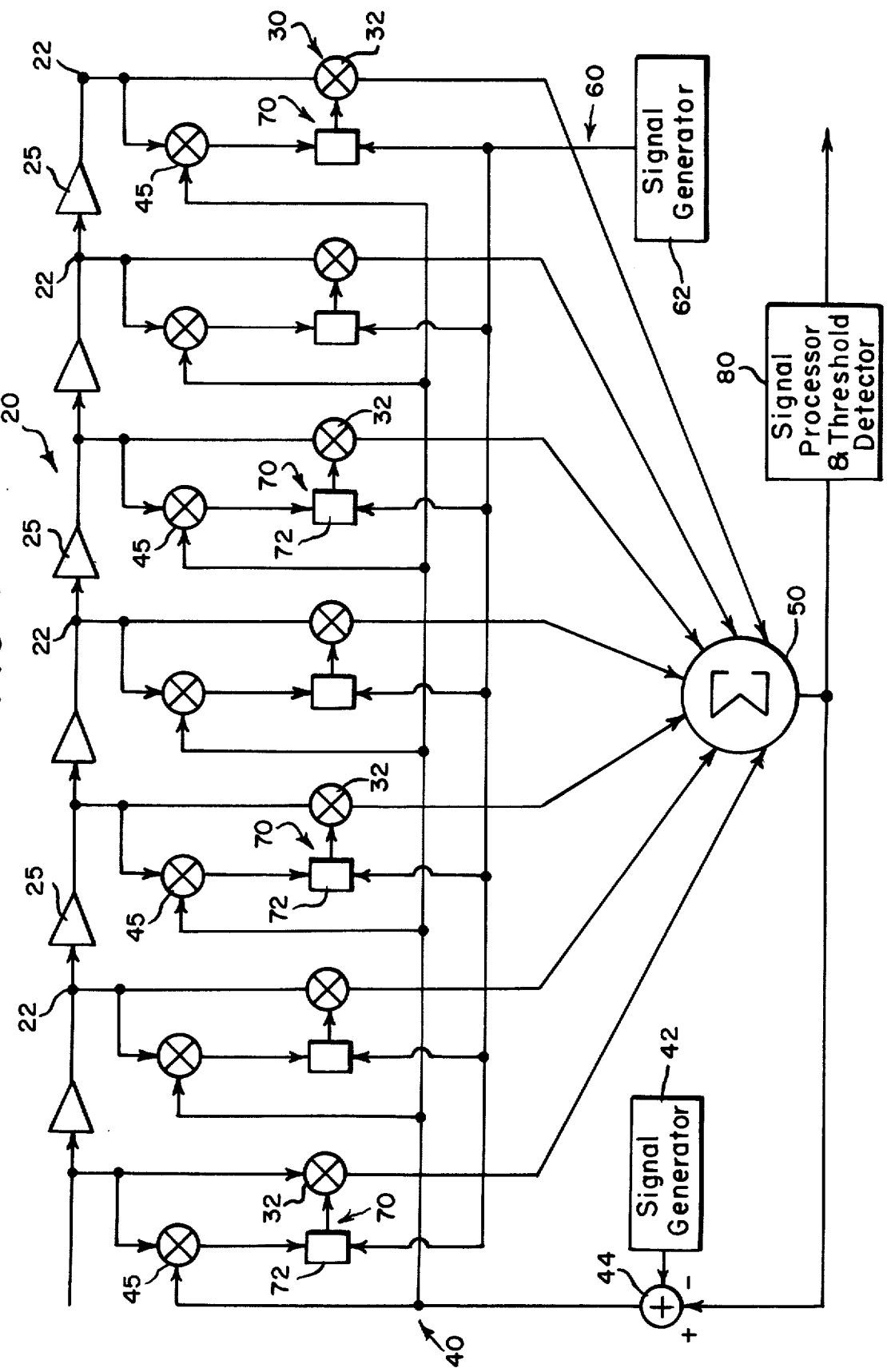
FIG. 3 is a schematic illustration of an illustrative embodiment of my invention.

Illustrative apparatus for practicing my invention is depicted in FIG. 3. The conventional portion of this apparatus is an adaptive equalizer comprising a tapped delay line 20, signal modifying means 30, signal generating means 40 and summing means 50. The output of summing means 50 is the signal output of this adaptive equalizer. The tapped delay line comprises a series of taps 22 with a delay line segment 25 between each tap. Illustratively, the taps are spaced apart by the time between successive symbols in the received signal which is sequentially shifted through the delay line. It will be recognized, however, that other spacings may be used, such as sub-multiples or multiples of the time between successive symbols. The signal modifying means modify the amplitude and/or phase of the signal at each tap in accordance with an input signal generated by signal generating means 40. Typically, modifying means 30 is a multiplier 32. Signal generating means 40 includes an ideal response signal generator 42, a summing point 44 and a signal multiplier 45 through which signals are applied to multiplier 32. A feedback loop from summing means 50 to summing point 44 enables the foregoing elements to operate in known fashion as a conventional equalizer to correct for amplitude and/or phase distortions in the received signal. See, for example, J. G. Proakis cited above. Numerous other feedback circuits suitable for use in an adaptive equalizer will be apparent to those skilled in the art.

I have found that such conventional adaptive equalizers can be modified to provide for preamble synchronization by the addition of a second signal generating means 60, gating means 70 and a signal processor and threshold detector 80. Signal generating means 60 comprises a signal generator 62 which produces signals which are proportional to the complex conjugate on a signal by signal basis of certain of the signals that are known, or are expected, to be at taps 22 at some point during the process of shifting the training sequence through the delay line. Typically, signal generator 62 is a read-only memory and the circuitry necessary to route its output signals to the correct multipliers 32. Gating means 70 constitutes a series of conventional logic gates 72 which operate to apply to each multiplier 32 either a signal from signal generator 62 or a signal from a multiplier 45. During reception of the training sequence at the receiver, these gates are operated so as to apply to the modifying means the signals from generator 62. Signal processor and threshold detector 80 is operated during reception of the training sequence to detect the exact baud time when the signals at taps 22 are proportional to the complex conjugates of the signals produced by signal generator 62. Thus, during reception of the training sequence these elements operate as a matched filter. Upon detection of such alignment, an output signal is produced by the signal processor and threshold detector 80 which establishes preamble synchronization between the receiver and the signal being received.

In practicing my invention, a data communication signal is transmitted from transmitter 10 to receiver 15 via communication channel 14. As the signal is received, it is demodulated by demodulator 16 and sequentially shifted through tapped delay line 20 in equalizer 17. After each shift of the signal, the signal at each tap 22 of the delay line is applied to signal modifying means 30.

At the front end of this communication signal is a training sequence. After each shift of the training sequence through the delay line, the signal at each tap of the delay line is multiplied in modifying means 30 by a signal from signal generating means 60; and the output from all the modifying means is summed by summing means 50. The signals applied to the different modifying means 30 from generating means 60 are typically different as will be apparent from an example to be given below. For each modifying means, however, the signal from generating means 60 remains the same throughout the process in which the training sequence is being shifted through the delay line.

As a result, the output of summing means 50 varies greatly as different sets of signals at the delay line taps are multiplied with the signals from generating means 60. When the output of summing means 50 attains a prespecified condition, as sensed by signal processor and threshold detector 80, the output signal is produced which establishes preamble synchronization. Once preamble synchronization is established, gating means 70 are switched so as to apply to modifying means 30 the signals from signal generating means 40. From this point on, the apparatus of FIG. 3 operates as an equalizer throughout the reception of the communication signal being shifted through delay line 20.

As will be apparent, my invention may be practiced with many modifications in the apparatus described above. Ideally, the signals applied to modifying means 30 from signal generating means 60 are proportional on a signal-by-signal basis to the complex conjugates of a group of signals that appears at the taps of the delay line at a prespecified time in the process of shifting the training sequence through the delay line. Thus, the complex conjugates need not be related to the signal that is transmitted but rather to the signal that is received with whatever amplitude and phase distortions are produced in the communication channel. In practice, however, these distortions vary with time and it is difficult to anticipate what they might be during any particular transmission period. Thus, it may be convenient to generate signals in generating means 60 that are proportional to the complex conjugates of a portion of the signal that is transmitted or are some compromise between what is transmitted and what is expected to be received. These and similar alternatives will be recognized as being approximately proportional to the complex conjugates of the received signals.

Different threshold criteria may be used by signal processor and threshold detector 80 to detect the exact baud time when the signals at taps 22 are proportional to the complex conjugate of the signals produced by signal generator 62. The criterion can be as simple as testing the output of summing means 50 to determine if it exceeds a pre-specified threshold. In practicing the invention, I have found empirically that it is preferable to test each output and the immediately preceding output of summing means 50 to see if they both exceed a threshold. If they do, preamble synchronization is established with the later of the two signals in the delay line which produce the two outputs. A more sophisticated technique would be to examine several of the outputs from summing means 50 and establish preamble synchronization with the signal in the delay line which produces the maximum output from summing means 50. The implementation of any of these threshold criteria and of numerous others will be apparent to those skilled in the art.

The training sequences that are used in communication systems vary with the equipment. The particular portion of this sequence that is used to establish preamble synchronization can vary as well as can the length of such portion. In practicing my invention I have used a portion of the sequence which is twelve symbols long and have generated a set of twelve signals in signal generating means 60 and applied them to the modifying means 30 connected to twelve successive taps 22 in delay line 20. For the circuit shown in FIG. 3, the first signal is applied to the right-hand most modifying means 30 and the remaining signals are applied in numerical order to the modifying means to the left thereof. For the training sequence presently used with the Bell System 208 modem, the signals generated are, as expressed in octal phase numbers: $-2$, $-3$, 2, $-3$, 4, $-3$, 2, 3, $-2$, $-3$, blank, $-1$. As will be recognized in the art, each octal phase number has a real and an imaginary component. The octal phase numbers 0 and 4 are pure real numbers with positive and negative magnitude, respectively; the octal phase numbers 2 and $-2$ are pure imaginary numbers with positive and negative magnitude, respectively; and the remaining octal numbers have non-zero real and imaginary values. The blank value in the twelve signal set has zero real and imaginary value and threfore makes no contribution to the process of matching the received signal. Effectively, the eleventh tap in the delay line is not used. Moreover, as suggested by this example, it is not necessary that successive symbols in the training sequence be used for the matching process. It also is not necessary to operate on discrete symbols. My invention may be practiced with any spacing between the taps of the delay line. It is only necessary that the signals applied to the multipliers 32 from generating means 62 be approximately proportional to the complex conjugate of the signals that would be expected to be present at such taps at some point during the process of shifting the training sequence through the delay line.

The particular details of the apparatus used in practicing my invention will be apparent to those skilled in the art from the foregoing description. For clarity of description, the details of the adaptive filter of FIG. 3 have been shown in block diagram form and only seven taps have been shown. As will be recognized by those skilled in the art, the multiplication of complex numbers that is performed by such a filter is actually achieved by splitting the received signal into two orthogonal components and applying each component to a physically separate delay line. Modifying means 30 is connected to a tap in each delay line such that the signal applied from these taps to the modifying means constitutes one of the symbols in the received signal. References in the claims to a "delay line" or a "tap" will be understood to include a plurality of delay lines or a tap in each such delay line where the received signal is applied to more than one delay line. As will also be apparent, it may be desirable to use a single multiplier to perform the various multiplications represented by the different multipliers 32 of FIG. 3. The circuitry and operation of such a single multiplier will be apparent to those skilled in the art.

I claim:

1. A data communication apparatus for processing a received signal comprising:
   an adaptive filter comprising:
      a tapped delay line having a plurality of spaced apart taps through which a received signal is sequentially shifted;
      means for modifying the amplitude and/or phase of the signal at each tap in accordance with an input signal;
      means for summing together the modified signal produced by each modifying means; and
      first means for generating input signals to correct for amplitude and/or phase distortions in the received signal;
   second means for generating input signals approximately proportional to the complex conjugate of a plurality of signals in a portion of the received signal;
   means for selectively applying to said modifying means at different times input signals from said first and said second input signal generating means; and
   means connected to an output of said summing means for producing an output signal representing the detection of said plurality of signals in a portion of the received signal.

2. The apparatus of claim 1 wherein said modifying means is a means for multiplying a signal at a tap of the delay line and an input signal to said modifying means.

3. The apparatus of claim 1 wherein, when input signals are being applied to said modifying means from said second input signal generating means, the modifying means multplies the signal at each of a plurality of taps of the delay line with a signal which is proportional to the complex conjugate of a signal in the received signal.

4. The apparatus of claim 1, 2, or 3 wherein the taps are spaced apart by an integral multiple of the time between successive symbols in the received signal.

5. A method of achieving synchronization between a receiver and a data communication signal received by said receiver, said method comprising the steps of:
   applying said received signal to a tapped delay line which has a plurality of spaced apart taps;
   sequentially shifting said received signal through said tapped delay line;
   multiplying the signals at each of a plurality of taps with signals approximately proportional to the complex conjugate of a plurality of signals in a portion of the received signal being shifted through the delay line;
   summing the products produced by the foregoing multiplication step; and
   producing an output signal representing the detection of said plurality of signals in the received signal when the signal produced in the foregoing summing step meets a prespecified criterion.

6. A method of achieving synchronization between a receiver and a data communication signal received by said receiver, said method comprising the steps of:
   applying said received signal to a tapped delay line which has a plurality of spaced apart taps;
   sequentially shifting said received signal through said tapped delay line;

multiplying the signals at each of a plurality of taps with signals approximately proportional to the complex conjugate of the signals that would be expected to be present at such taps at some point during the process of shifting the received signal through the delay line;

summing the products produced by the foregoing multiplication step; and producing an output signal representing the detection of said plurality of known signals in the received signal when the signal produced in the foregoing summing step meets a prespecified criterion.

7. The method of claim 5 or claim 6 wherein the step of multiplying signals comprises the steps of multiplying the signal at a first tap with a signal that is approximately the complex conjugate of a signal that would be expected to be present at said first tap at some point during the process of shifting the received signal through the delay line and multiplying the signal at a second tap with a signal that is approximately the complex conjugate of a signal that would be expected to be present at said second tap when the signal expected to be at said first tap is at said first tap.

8. A method of achieving synchronization between a receiver and a data communication signal received by said receiver, said method comprising the steps of:

applying said received signal to a tapped delay line which has a plurality of spaced apart taps through which said received signal is sequentially shifted;

for each shift of the received signal through said delay line, multiplying the signals at each of a plurality of taps with the same set of signals approximately proportional to the complex conjugate of a plurality of signals in a portion of the received signal;

for each shift of the received signal, summing the products produced by said multiplication step; and producing an output signal representing the detection of said plurality of signals in the received signal when the signal produced in said summing step meets a prespecified criterion.

9. A method of achieving synchronization between a receiver and a data communication signal received by said receiver, said method comprising the steps of:

applying said received signal to a tapped delay line which has a plurality of spaced apart taps through which said received signal is sequentially shifted;

multiplying the signal at each of a plurality of taps with a signal approximately proportional to the complex conjugate of a signal that is expected to be present at said tap at some point during the process of shifting the received signal through the delay line;

summing the products produced by said multiplication step;

sequentially shifting said received signal through said tapped delay line;

repeating the foregoing steps of muliplying the signals and summing the products for each shift of the received signal; and producing an output signal representing the detection of said plurality of known signals in the received signal when the signal produced in said summing step meets a prespecified criterion.

10. The method of claim 8 or claim 9 wherein the multiplying step comprises the steps of multiplying the signal at a first tap with a signal that is approximately the complex conjugate of a signal that is expected to be present at said first tap at some point during the process of shifting the received signal through the delay line and multiplying the signal at a second tap with a signal that is approximately the complex conjugate of a signal that is expected to be present at said second tap when the signal expected to be at said first tap is at said first tap.

* * * * *